United States Patent Office 3,025,289
Patented Mar. 13, 1962

3,025,289
5-ALKOXY-2,3,6-TRISAZIRIDINO-1,4-BENZOQUINONE
Gerhard Domagk, % Farbenfabriken Bayer A.G., Wuppertal-Elberfeld, Germany, and Walter Gauss, % Farbenfabriken Bayer A.G., Leverkusen-Bayerwerk, Germany
No Drawing. Filed July 6, 1959, Ser. No. 824,949
Claims priority, application Germany July 12, 1958
2 Claims. (Cl. 260—239)

This invention relates to new organic chemical compounds, and is more particularly concerned with the synthesis of certain novel monoalkoxytriaziridinoquinones which are found to exhibit physiological activity within warm-blooded animals. Specifically, the invention involves the provision of certain unique monoalkoxy-substituted tris-aziridino-1,4-benzoquinones that are useful in the treatment of amebas infections, including amebic colitis, amebic hepatitis, amebic abscesses, and amebic dysentery, caused by the microorganism, *Entamoeba histolytica*.

The utility of quinone derivatives such as 2,6-bis-aziridino-1,4-benzoquinone and 2,3,6-tris-aziridino-1,4-benzoquinone against amebiasis has been demonstrated heretofore (see copending application Serial No. 720,548, filed by Walter Gauss and Gerhard Domagk on March 11, 1958), now U.S. Patent 2,976,279. The present invention is based, in part, on the observation that equally effective anti-amebiasis agents of greatly reduced toxicity can be obtained by the introduction of alkoxy substituents onto tris-aziridino quinone derivatives of the general class described.

The production of 2,6-bis-aziridino-3,5-bis-alkoxy-1,4-benzoquinones has been described heretofore (Chimia 11:260 [1956]; Helv. Chim. Acta 40: 502–507 [1957]. We have found that the action of ethylene imine upon compounds of the foregoing type leads to substitution of one of the two alkoxy groups by an ethylenimino radical with formation of the desirable monoalkoxy-substituted tris-aziridino-1,4-benzoquinone derivatives. This rather unexpected reaction mechanism is illustrated by the following structural equation:

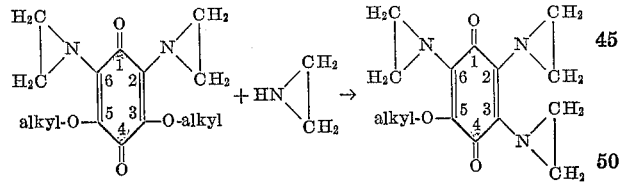

Suitable starting materials for the foregoing reaction include quinone derivatives such as 2,6-bis-aziridino-3,5-bis-methoxy-1,4-benzoquinone; 2,6-bis-aziridino-3,5-bis-ethoxy-1,4-benzoquinone; and 2,6-bis-aziridino-3,5-bis-propoxy-1,4-benzoquinone. The reaction is preferably carried out within inert diluents. We have found the most favorable solvents to be alcohols corresponding to the -O-alkyl radicals linked to the quinone nucleus. The reaction requires 1 mole of ethylene imine for each mole of the quinone starting material, but it usually proves expedient to employ an excess of the ethylene imine reactant. The synthesis proceeds at room temperature with adequate speed, but it may be accelerated by slight heating. In this connection, however, care must be exercised to avoid polymerization due to heating of the reaction mixtures.

The end-products of the reaction may be isolated and purified by conventional techniques, and represent crystalline, dark-colored substances of high stability.

It is believed that our invention may be best understood by reference to the following specific example illustrating the application of the foregoing principles and procedures to the synthesis of a typical compound of the invention:

*Example*

2,6 - bis - aziridino - 3,5-bis-ethoxy-1,4-benzoquinone, in amount 27.8 grams (0.1 mole), 350 cubic centimeters of pure ethyl alcohol, and 52 cubic centimeters (1 mole) of ethylene imine were contacted under nitrogen in the presence of ice cooling and agitation. The cooling was subsequently discontinued, and the reaction mixture was stirred at room temperature for 75 hours.

There precipitated the desired reaction product, 5-ethoxy-2,3,6-tris-aziridino-1,4-benzoquinone, which was filtered off by vacuum at −20° C., washed with intensively cooled alcohol, and dried in a vacuum exsiccator (23.2 grams decomposing at 176–178° C.). The product was twice recrystallized from 15 volumes of alcohol, forming small rectangular flakes having the decomposition point of 182–185° C., which are purple-colored and show a yellow glistening under the microscope. The yield was 16 grams. A sample which had been vacuum-dried over phosphorus pentoxide analyzed as follows:

|  | C | H | N | O |
|---|---|---|---|---|
| Calculated | 61.08 | 6.22 | 15.26 | 17.44 |
| Found | 60.90 | 6.02 | 15.30 | 17.60 |

Having thus described the subject matter of our invention, what it is desired to secure by Letters Patent is:

1. A chemical compound of the formula:

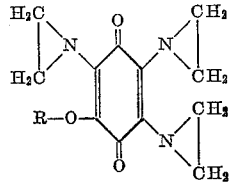

wherein R is a lower alkyl radical.

2. The chemical compound 5-ethoxy-2,3,6-tris-aziridino-1,4-benzoquinone.

References Cited in the file of this patent

FOREIGN PATENTS

| 793,860 | Great Britain | Apr. 23, 1958 |
| 1,044,816 | Germany | Nov. 27, 1958 |

UNITED STATES PATENT OFFICE
CERTIFICATE OF CORRECTION

Patent No. 3,025,289　　　　　　　　　　　　　March 13, 1962

Gerhard Domagk et al.

It is hereby certified that error appears in the above numbered patent requiring correction and that the said Letters Patent should read as corrected below.

Column 2, line 34, after "follows:" insert
-- $C_{14}H_{17}N_3O_3$ (M.W. 275.30) --, as heading to the table.

Signed and sealed this 3rd day of July 1962.

(SEAL)
Attest:

ERNEST W. SWIDER
Attesting Officer

DAVID L. LADD
Commissioner of Patents